(12) United States Patent
Clemen (10) Patent No.: US 9,303,875 B2
(45) Date of Patent: Apr. 5, 2016

(54) GAS-TURBINE COMBUSTION CHAMBER HAVING NON-SYMMETRICAL FUEL NOZZLES

(71) Applicant: Rolls-Royce Deutschland Ltd & Co KG, Blankenfelde-Mahlow (DE)

(72) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 562 days.

(21) Appl. No.: 13/755,779

(22) Filed: Jan. 31, 2013

(65) Prior Publication Data

US 2013/0199187 A1    Aug. 8, 2013

(30) Foreign Application Priority Data

Feb. 8, 2012   (DE) .......................... 10 2012 002 465

(51) Int. Cl.

| F23R 3/32 | (2006.01) |
| F02C 7/228 | (2006.01) |
| F02C 7/00 | (2006.01) |
| F23R 3/28 | (2006.01) |
| F23R 3/50 | (2006.01) |

(52) U.S. Cl.
CPC ... *F23R 3/32* (2013.01); *F02C 7/00* (2013.01); *F02C 7/228* (2013.01); *F23R 3/28* (2013.01); *F23R 3/50* (2013.01)

(58) Field of Classification Search
None
See application file for complete search history.

(56) References Cited

U.S. PATENT DOCUMENTS

| 4,720,970 | A | * | 1/1988 | Hudson et al. .................. 60/804 |
| 5,351,475 | A | * | 10/1994 | Ansart et al. .................... 60/804 |
| 6,038,861 | A |   | 3/2000 | Amos et al. |
| 6,119,459 | A |   | 9/2000 | Gomez et al. |
| 6,568,190 | B1 |   | 5/2003 | Tiemann |
| 6,676,048 | B1 | * | 1/2004 | Tiemann ....................... 239/601 |
| 7,836,699 | B2 |   | 11/2010 | Graves |
| 2004/0163392 | A1 |   | 8/2004 | Nishida et al. |
| 2007/0289305 | A1 | * | 12/2007 | Oda et al. ........................ 60/748 |
| 2008/0184708 | A1 | * | 8/2008 | Moriwaki et al. ............... 60/747 |

FOREIGN PATENT DOCUMENTS

| DE | 112005002065 | 9/2011 |
| EP | 2151630 | 2/2010 |

OTHER PUBLICATIONS

German Search Report dated Oct. 18, 2012.

* cited by examiner

*Primary Examiner* — Devon Kramer
*Assistant Examiner* — Kenneth J Hansen
(74) *Attorney, Agent, or Firm* — Timothy J. Klima; Shuttleworth & Ingersoll, PLC (57) ABSTRACT

The present invention relates to an annular gas-turbine combustion chamber having a radially outer and a radially inner combustion chamber wall relative to a machine axis, a combustion chamber head and a combustion chamber outlet nozzle, where the combustion chamber head includes several fuel nozzles spread over its circumference for supplying air and fuel, the latter exiting in an outlet surface of the fuel nozzles, where the respective fuel nozzle has a burner axis which is vertical to the outlet surface and where the intersections of the burner axes with the outlet surfaces define a circular burner centerline around the engine axis, characterized in that a cross-sectional area of the fuel nozzle radially outside the burner centerline is identical to a cross-sectional area radially inside the burner centerline.

16 Claims, 6 Drawing Sheets

GAS-TURBINE COMBUSTION CHAMBER HAVING NON-SYMMETRICAL FUEL NOZZLES

This application claims priority to German Patent Application 102012002465.7 filed Feb. 8, 2012, the entirety of which is incorporated by reference herein.

This invention relates to an annular gas-turbine combustion chamber having a radially outer and a radially inner combustion chamber wall relative to a machine axis, a combustion chamber head and a combustion chamber outlet nozzle, where the combustion chamber head includes several fuel nozzles spread over its circumference for supplying air and fuel, where the respective fuel nozzle has a burner axis which is vertical to an outlet surface of the fuel nozzle and where the intersections of the individual burner axes with the outlet surfaces define a circular burner centerline around the engine axis. The invention also relates to an individual combustion chamber with only one fuel nozzle, as is also known from the state of the art.

An annular combustion chamber has an upper/outer combustion chamber wall and a lower/inner combustion chamber wall that together form an annular duct. Air and fuel are supplied to the combustion chamber by the fuel nozzle, and air is also supplied by cooling or air inlet openings on the side walls. Air and fuel are mixed and combusted in the fuel nozzle. The air and the combustion products are passed through the combustion chamber outlet nozzle in the direction of the turbine.

A study of combustion chambers known from the state of the art shows that the fuel nozzle cross-sections or their internal ducts, designed symmetrical about the burner axis but non-symmetrical about the burner centerline, have the drawback that differing quantities of air and fuel are supplied into the combustion chamber volume radially outside and radially inside the burner centerline and this has a negative effect on the mixing of air and fuel and hence a negative effect on flame formation, flame stability and the combustion of fuel, such that the emissions of the combustion chamber are negatively affected as a result.

The object underlying the present invention is to provide a gas-turbine combustion chamber of the type specified at the beginning which, while being simply designed and easily and cost-effectively producible, is characterized by optimum flow conditions and optimum mixing of air and fuel and shows good flame formation and flame stability.

It is a particular object of the present invention to provide solution to the above problematics by a combination of the features of Claim 1. Further advantageous embodiments of the present invention become apparent from the sub-claims.

In accordance with the invention, it is thus provided that a cross-sectional area of the fuel nozzle radially outside the burner centerline is identical to a cross-sectional area radially inside the burner centerline.

In accordance with the invention, the fuel nozzles are thus designed non-round and non-symmetrical in a sectional plane vertical to the burner axis of the fuel nozzle. In the state of the art, the fuel nozzles are in each case designed circular, resulting in the aforementioned disadvantageous flow conditions. In accordance with the invention, the fuel nozzles are in contrast to that designed such that identical cross-sections (cross-sectional areas) are obtained radially outside and radially inside the burner centerline.

The present invention provides a solution where the design of the fuel nozzle and its internal air/fuel duct geometry is designed symmetrical to the burner centerline in terms of its cross-sectional areas.

The present invention relates both to any number of internal ducts and also to the burner outer contour, where duct cross-sections in accordance with the invention can also be combined with a conventional circular outer contour and with any other contour too. Furthermore, any number of internal duct cross-sections can be combined with any number of other cross-sections.

An improved mixing of fuel and air is thus achieved in accordance with the invention, which results in an improved flame formation and improved flame stability. This ensures better burn-out and lower emissions.

The present invention is described in the following in light of the accompanying drawing, showing an exemplary embodiment. In the drawing.

Figure 1:
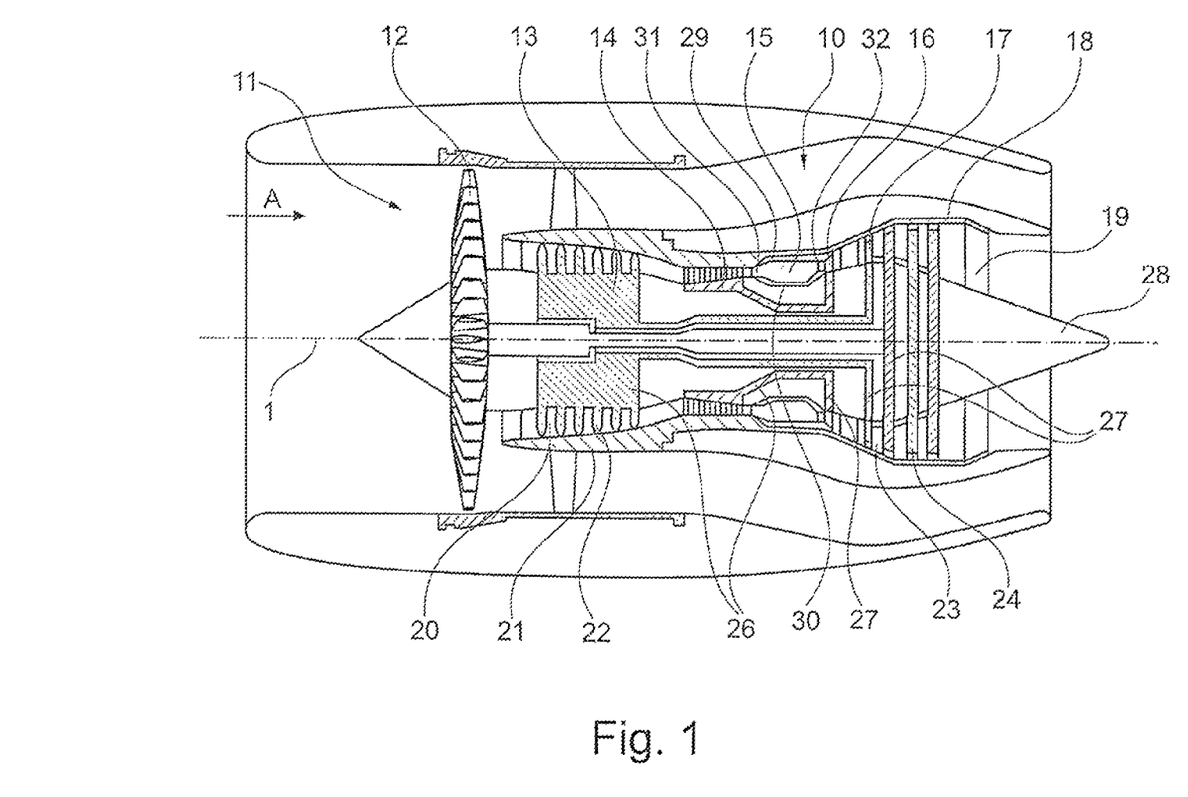
FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, an annular combustion chamber 15, a high-pressure turbine 16, an intermediate-pressure turbine 17 and a low-pressure turbine 18 as well as an exhaust nozzle 19, all of which being arranged about a central engine axis 1. Reference numeral 28 shows an exhaust cone.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

The burners or the fuel nozzle 33 in annular combustion chambers 15 of stationary gas turbines or aircraft gas turbines are characterized in that the air and the fuel are specifically routed and mixed.

Figure 2:
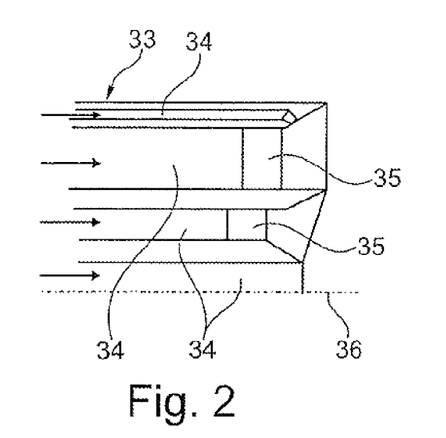
FIG. 2 shows a partial sectional view through of a fuel nozzle known from the state of the art.
Figure 3:
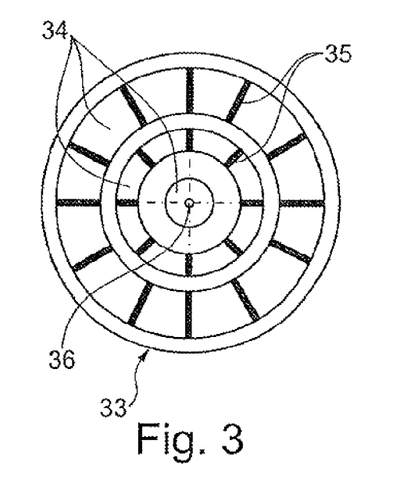
FIG. 3 shows a front-side view of the fuel nozzle shown in FIG. 2.
Figure 4:
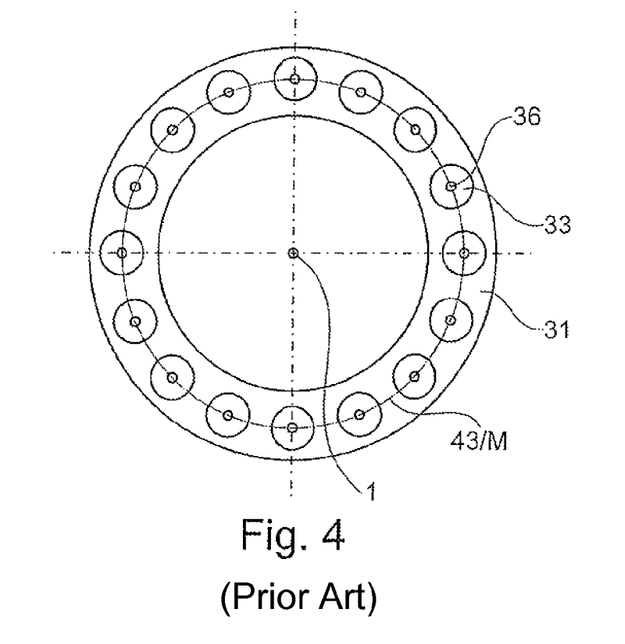
FIG. 4 shows a front-side sectional view of an annular combustion chamber known from the state of the art in a radial plane radially to the engine axis.

FIGS. 2 to 4 show schematically the burner/fuel nozzle 33 for an annular combustion chamber 15. Air and fuel are routed through several ducts 34 or 37, the air being given a twist with the aid of guide elements 35 so that air and fuel can mix. The number of air and fuel ducts 34 or 37 can be as required, with their cross-sectional shape being circular or annular, and symmetrical about the burner axis 36. Since the fuel nozzles 33 are distributed in an annular pattern about the engine axis 1 on the circumference of the annular combustion chamber 15, the individual burner axes 36 can be connected to one another to form a burner centerline 43 or M. Relative to this burner centerline 43 or M, the cross-sectional area of an individual duct 34 or 37, and hence the total of all cross-sectional areas of all ducts above and below the burner centerline 43 or M, is not identical due to the symmetrical design of the fuel nozzle geometry or its ducts.

Figure 5:
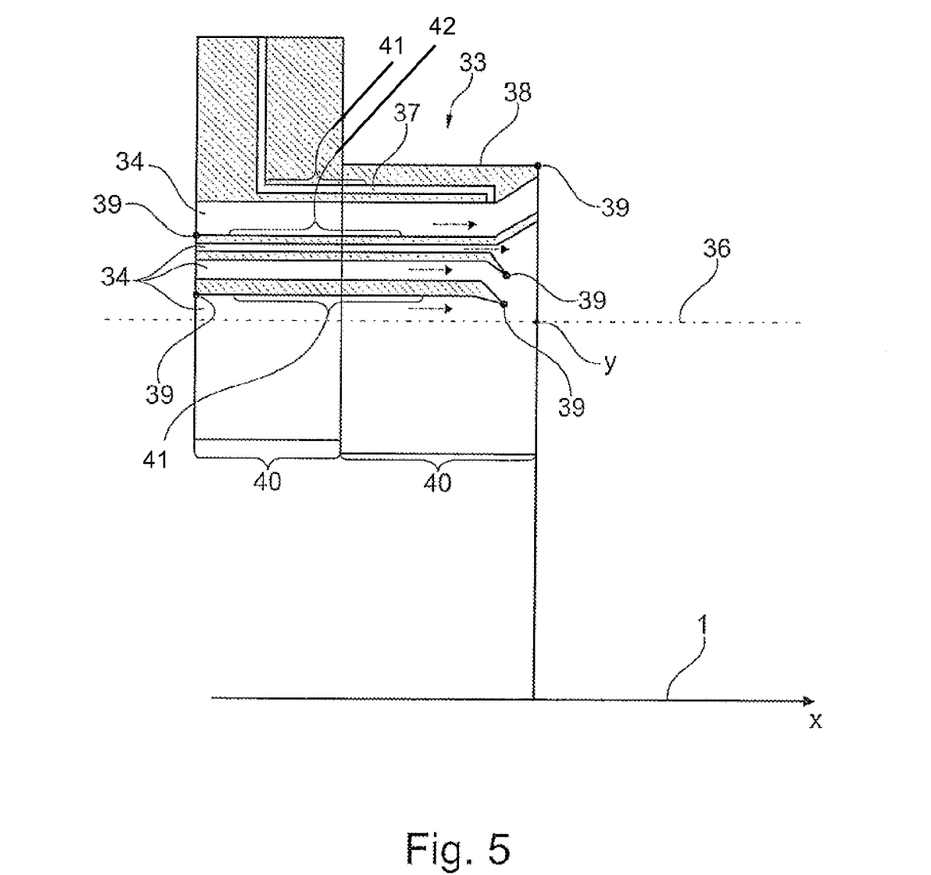
FIG. 5 shows an enlarged partial sectional view of a fuel nozzle in accordance with the present invention.

FIG. 5 shows a section through a fuel nozzle 33 with its outer contour 38, burner axis 36, engine axis 1, internal flow ducts (for air 34 and for fuel 37) and by way of example a number of points 39 or regions 40 to which the invention is applicable. Here the respective cross-sectional area is always delimited by an upper (outer) contour 41 and a lower (inner) contour 42 to which the embodiment in accordance with the invention is applied. The application areas are in this case all contour geometries inside and on the outer contour of the fuel nozzle 33 along the burner axis 36 and all delimiting edges inside the contours 41 and 42 respectively.

The design in accordance with the invention of the cross-section of the fuel nozzle 33 about the burner centerline 43 or M is such that the radially inner contour 42 and the radially outer contour 41 of the fuel nozzle are designed such that circular or annular contours exist below the burner centerline 43 or M, and elliptical contours are generated above the burner centerline. The respective cross-sections (cross-sectional areas) then form between these contours. The contours 41 and 42 are designed here in accordance with the invention such that the cross-sectional areas above and below the burner centerline 43 or M are identical and that two associated cross-sections are added together in each case to obtain the required total cross-sectional area of the fuel nozzle 33.

Figure 6:
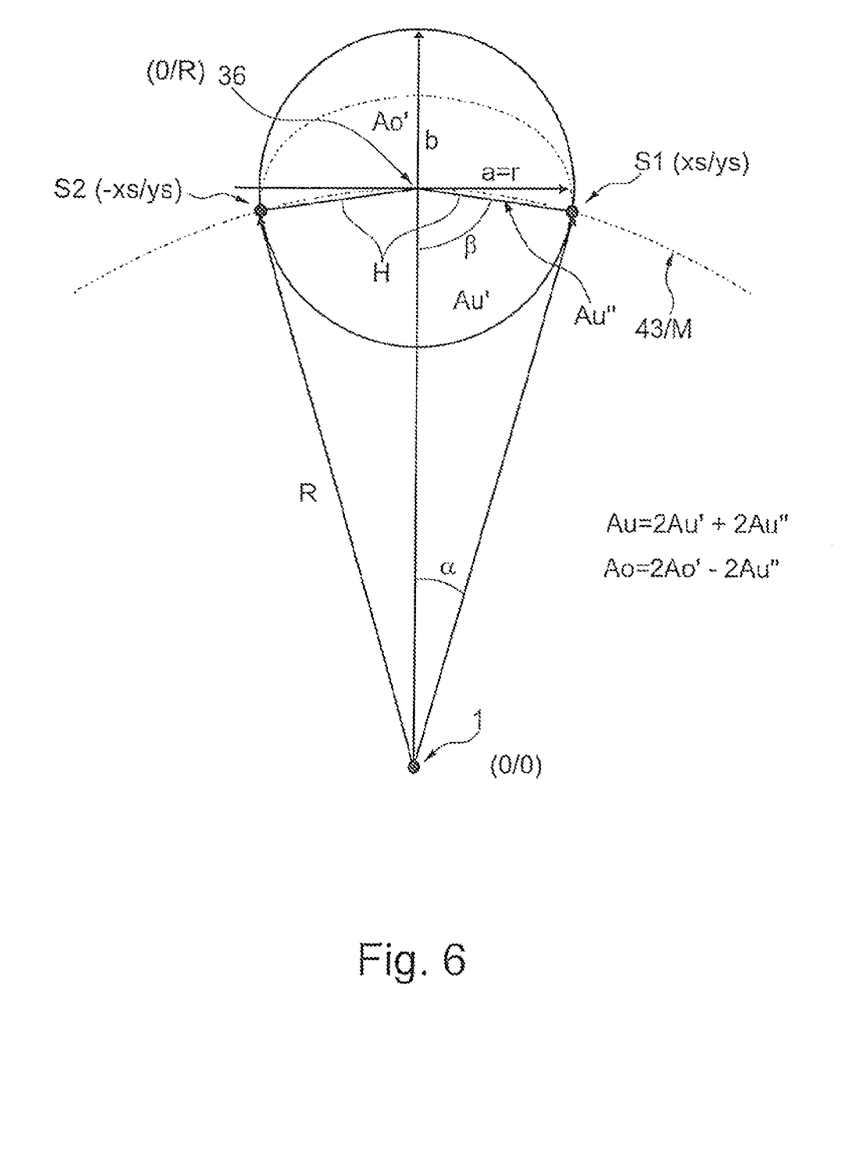
FIG. 6 shows a schematic representation of the mathematical correlations of the solution in accordance with the present invention.

FIG. 6 shows the mathematical correlations and the definitions of the individual sizes:

Relative to the engine axis 1 which is at x=0 and y=0, the axis of the fuel nozzle (burner axis 36) is on a certain radius R. For the description of the design in accordance with the invention, the center point of a burner axis 36 is now defined relative to x=0, y=R.

With the radius R, the burner centerline 43 or M intersecting the burner axis 36 in (0/R) is also obtained.

Since the contour below the burner centerline 43 or M is designed circular, a circle having the radius r can be plotted around the burner axis 36, with its sector below the burner centerline 43 or M corresponding to a contour of the cross-sectional area to be provided.

This circle intersects the burner centerline 43 or M at two points: intersection S1 and intersection S2 with the coordinates S1=(xs/ys) and S2=(−xs/ys). The coordinates can be determined here as follows:

$$ys=(r^2-R^2)/(-2 \cdot R)$$

$$xs=\sqrt{(R^2-ys^2)}$$

To determine the area Au of the circular sector below the burner centerline 43 or M, the two areas Au' (see FIG. 6) describing the area of the circular sector between the auxiliary lines H, and the areas Au" describing the area between the auxiliary lines H and the burner centerline 43 or M, are added together to form Au=2·Au'+2·Au", where Au' and Au" are determined with knowledge of the angles α and β (see FIG. 6).

$$\alpha = \arcsin(xs/R)$$

$$\beta = 90 - \arcsin((R-ys)/r)$$

$$Au'' = \tfrac{1}{2} \cdot R \cdot (\alpha - \sin \alpha)$$

$$AU' = \tfrac{1}{2} \cdot R^2 \cdot \beta$$

The area above the burner centerline 43 or M is, in accordance with the invention, Ao=Au.

Since the contour 41 above the burner centerline 43 or M in accordance with the invention is elliptical, it is determined by the two half-axes a=r and b using the ellipsis equation $$y=\sqrt{((1-x^2/r^2) \cdot b^2)+R}.$$

The half-axis b can be determined from the condition Ao=Au with:

$$Ao = 2 \cdot Ao' - 2 \cdot Au'',$$

where Au" is already known and Ao' can be determined with: Ao'=½·a·b·(πb−β), then b=(Au+2·Au")/((π−β)·a).

For the other contour 42 of the cross-sectional area to be provided, this procedure can be repeated by analogy with another radius r and corresponding b and similarly for every further required contour line of the fuel nozzle.

Figure 7:
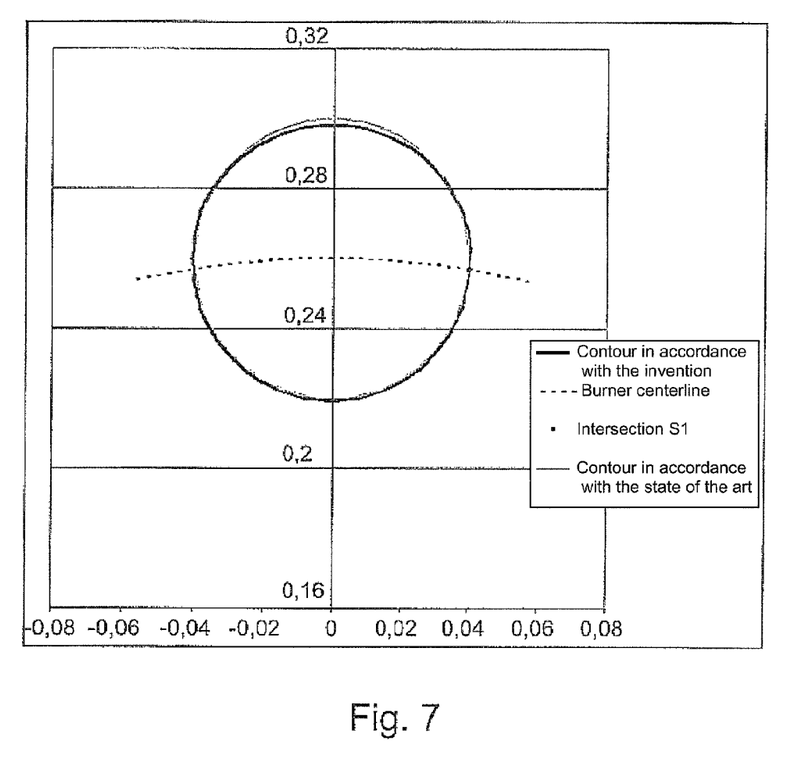
FIG. 7 shows a graphical representation of an exemplary embodiment of a fuel nozzle in accordance with the present invention.
Figure 8:
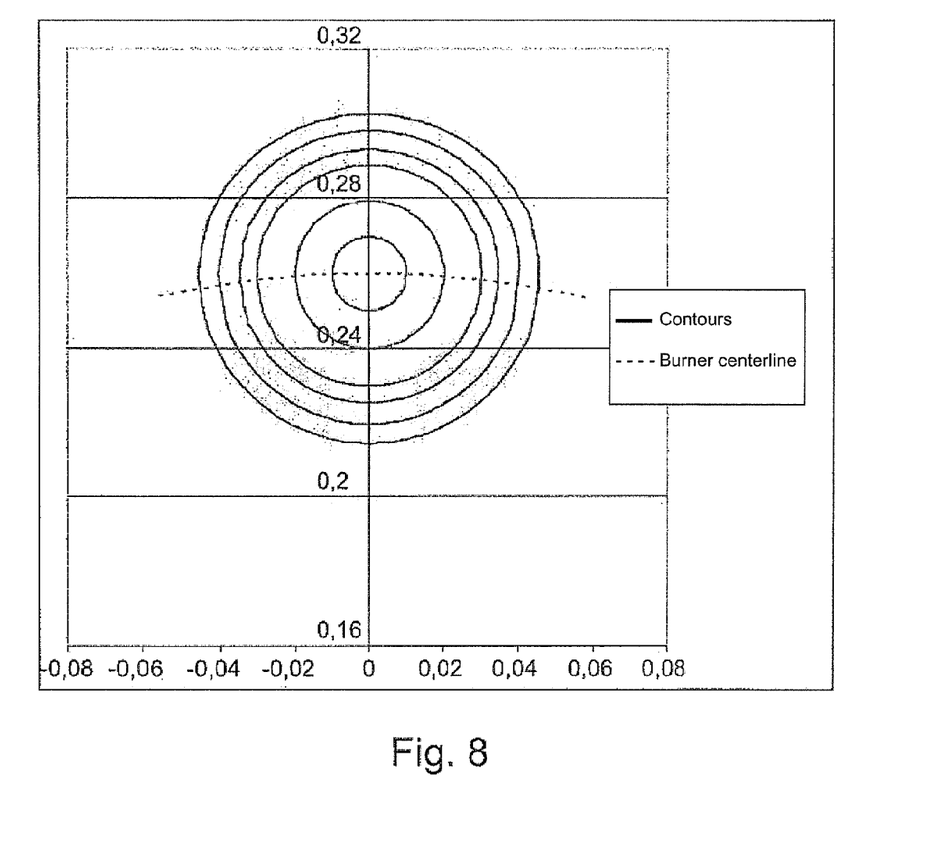
FIG. 8 shows a further representation, by analogy with FIG. 7.

FIG. 6 shows the definition of the sizes used, FIG. 7 an example for different contours, and FIG. 8 an example for the top view onto a burner geometry designed in accordance with the invention.

The present invention was described in connection with an annular combustion chamber. It is understood that the solution in accordance with the invention can also be applied in a gas turbine with several individual combustion chambers distributed circumferentially around the engine axis and each having a fuel nozzle.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Annular combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Outer combustion chamber wall
30 Inner combustion chamber wall
31 Combustion chamber head 32 Combustion chamber outlet nozzle
33 Fuel nozzle
34 Air duct
35 Guide element
36 Burner axis
37 Fuel duct
38 Outer contour
39 Point
40 Region
41 Radially outer contour
42 Radially inner contour
43 burner centerline M

What is claimed is:

1. An annular gas-turbine combustion chamber comprising:
a radially outer and a radially inner combustion chamber wall relative to a central engine axis,
a combustion chamber head,
a combustion chamber outlet nozzle,
wherein the combustion chamber head includes a plurality of fuel nozzles distributed over a circumference of the combustion chamber head, each including at least one air duct and at least one fuel duct for supplying air and fuel, the fuel exiting in an outlet surface of each of the fuel nozzles, each of the fuel nozzles including a burner axis which is perpendicular to the outlet surface, a center point of a line extending between widest points of the at least one air duct in a generally circumferential direction establishing a position of the burner axis, intersections of the burner axis with the outlet surfaces defining a circular burner centerline around the engine axis,
wherein, each of the fuel nozzles includes a cross-sectional area radially outside the burner centerline of the air and fuel ducts and a cross-sectional area radially inside the burner centerline of the air and fuel ducts, with the cross-sectional area radially outside the burner centerline being identical to the cross-sectional area radially inside the burner centerline.

2. The annular gas-turbine combustion chamber in accordance with claim 1, wherein each of the fuel nozzles includes a partly circular cross-section radially inside the burner centerline and a partly elliptical cross-section radially outside the burner centerline.

3. The annular gas-turbine combustion chamber in accordance with claim 1, wherein the cross-sectional area radially outside the burner centerline and the cross-sectional area radially inside the burner centerline which are identical are provided adjacent the outlet surface of each of the fuel nozzles.

4. The annular gas-turbine combustion chamber in accordance with claim 1, wherein the cross-sectional area radially outside the burner centerline and the cross-sectional area radially inside the burner centerline which are identical are provided in any sectional plane of each of the fuel nozzles along the burner axis of each of the fuel nozzles.

5. The annular gas-turbine combustion chamber in accordance with claim 1, wherein the burner axes are arranged parallel to the central engine axis.

6. The annular gas-turbine combustion chamber in accordance with claim 5, wherein the cross-sectional area radially outside the burner centerline and the cross-sectional area radially inside the burner centerline which are identical are provided on a frustoconical surface rotationally symmetrical to the central engine axis.

7. The annular gas-turbine combustion chamber in accordance with claim 1, wherein the burner axes are arranged at an angle to the central engine axis.

8. The annular gas-turbine combustion chamber in accordance with claim 1, wherein the cross-sectional area radially outside the burner centerline is identical to the cross-sectional area radially inside the burner centerline because a shape of a central portion of an external border of the cross-sectional area radially outside the burner centerline is different from a shape of a central portion of an external border of the cross-sectional area radially inside the burner centerline.

9. A gas turbine combustion chamber for a gas turbine engine comprising:
a combustion chamber head,
a combustion chamber outlet nozzle,
wherein the combustion chamber head includes a plurality of fuel nozzles, each including at least one air duct and at least one fuel duct for supplying air and fuel, the fuel exiting in an outlet surface of each of the fuel nozzles, each of the fuel nozzles including a burner axis which is perpendicular to the outlet surface, a center point of a line extending between widest points of the at least one air duct in a generally circumferential direction establishing a position of the burner axis,
a plurality of combustion chambers distributed over a circumference relative to a central engine axis of the gas turbine engine, each of the combustion chambers including one of the fuel nozzles, intersections of the burner axes with the outlet surfaces defining a circular burner centerline around the engine axis, wherein, at least one of the fuel nozzles includes a cross-sectional area radially outside the burner centerline of the air and fuel ducts and a cross-sectional area radially inside the burner centerline of the air and fuel ducts, with the cross-sectional area radially outside the burner centerline being identical to the cross-sectional area radially inside the burner centerline.

10. The gas-turbine combustion chamber in accordance with claim 9, wherein the at least one of the fuel nozzles includes a partly circular cross-section radially inside the burner centerline and a partly elliptical cross-section radially outside the burner centerline.

11. The gas-turbine combustion chamber in accordance with claim 9, wherein the cross-sectional area radially outside the burner centerline and the cross-sectional area radially inside the burner centerline which are identical are provided adjacent the outlet surface of the at least one of the fuel nozzles.

12. The gas-turbine combustion chamber in accordance with claim 9, wherein the cross-sectional area radially outside the burner centerline and the cross-sectional area radially inside the burner centerline which are identical are provided in any sectional plane of the at least one fuel nozzles along the burner axis of the at least one of the fuel nozzles.

13. The gas-turbine combustion chamber in accordance with claim 9, wherein the burner axes are arranged parallel to the central engine axis.

14. The gas-turbine combustion chamber in accordance with claim 13, wherein the cross-sectional area radially outside the burner centerline and the cross-sectional area radially inside the burner centerline which are identical are provided on a frustoconical surface rotationally symmetrical to the central engine axis.

15. The gas-turbine combustion chamber in accordance with claim 9, wherein the burner axes are arranged at an angle to the central engine axis.

16. The gas-turbine combustion chamber in accordance with claim 9, wherein the cross-sectional area radially outside the burner centerline is identical to the cross-sectional area radially inside the burner centerline because a shape of a central portion of an external border of the cross-sectional area radially outside the burner centerline is different from a shape of a central portion of an external border of the cross-sectional area radially inside the burner centerline.

* * * * *